United States Patent [19]

Clement et al.

[11] Patent Number: 5,206,496

[45] Date of Patent: Apr. 27, 1993

[54] SUB-SURFACE MARKING

[75] Inventors: Robert M. Clement; Neville R. Ledger, both of Swansea; Robert P. Sunman, Cardiff, all of Wales

[73] Assignee: United Distillers, PLC, England

[21] Appl. No.: 745,170

[22] Filed: Aug. 15, 1991

[30] Foreign Application Priority Data

Aug. 15, 1990 [GB] United Kingdom ............... 9017939
Sep. 12, 1990 [GB] United Kingdom ............... 9019929
Nov. 27, 1990 [GB] United Kingdom ............... 9025790

[51] Int. Cl.$^5$ ............................................. G06K 7/10
[52] U.S. Cl. ................................. 250/271; 219/121.6
[58] Field of Search ................. 250/271; 219/121.6, 219/121.65, 121.66, 121.85; 427/12, 53.1, 54.1, 55

[56] References Cited

U.S. PATENT DOCUMENTS

| 4,743,463 | 5/1988 | Ronn et al. |
| 4,758,703 | 7/1988 | Drever et al. |
| 4,769,310 | 9/1988 | Gugger et al. |
| 4,822,973 | 4/1989 | Fahner et al. |

FOREIGN PATENT DOCUMENTS

| 2236666 | 1/1975 | France |
| 2495982 | 6/1982 | France |
| 8900078 | 8/1989 | PCT Int'l Appl. |
| WO90/01418 | 2/1990 | PCT Int'l Appl. |
| 1198045 | 7/1970 | United Kingdom |
| 1523548 | 9/1978 | United Kingdom |
| 2092066 | 8/1982 | United Kingdom |

OTHER PUBLICATIONS

Technica, vol. 37, No. 2, Feb. 1988, Zurich, pp. 54–56, D. Winkler: "Status Quo Beim Laserbeschriften"p. 55, ln. 1–p. 56, ln. 20.

Feinwerktechnik + Messtechnik. vol. 96, No. 7–8, Jul. 1988, DE pp. 308–310; F. Tuma: "Beschriften Mit Laserstrahlen" see the whole document.

Primary Examiner—Jack I. Berman
Assistant Examiner—Kiet T. Nguyen
Attorney, Agent, or Firm—Antonelli, Terry, Stout & Kraus

[57] ABSTRACT

A method and apparatus for providing a body of material (14) with sub-surface marking in the form of an area of increased opacity to electromagnetic radiation. The method includes directing at a surface of the body (14) a high energy density beam (12, 26) to which the material (14) is transparent, and bringing the beam (12,26) to a focus at a location spaced from the surface and within the body (14) so as to cause localized ionization of the material (14). In a prefered embodiment the apparatus includes a laser (10) as a high energy density beam source and provides means (36, 38) to move the focus of the beam (12,26) relative to the body (14) so as to enable the mark to be of a predetermined shape.

25 Claims, 1 Drawing Sheet

SUB-SURFACE MARKING

BACKGROUND OF THE INVENTION

The present invention relates to a method and apparatus for providing a body of material with a sub-surface mark using a high energy density beam and additionally relates to a body marked in accordance with the said method or by use of the said apparatus.

Many products are packaged in transparent containers of glass or plastic and there has been a desire for many years to provide containers of this type with a method of marking such that once a mark has been applied, the mark cannot be removed. Such a method of marking would have obvious anti-counterfeiting applications but would also allow for the application of a code specific to each container and so would facilitate product tracking.

It is known for some manufacturers of, for example, more expensive fragrances, to restrict the number and quality of the retail outlets which they authorise to sell their products. As a result, other outlets which desire to retail the same product must do so by utilising illegitimate sources of supply. It is in the manufacturer's interests to curtail any unauthorised transfer of goods which not only can be damaging to the manufacturer's reputation but also can greatly enhance the activities of counterfeiters who are not hindered by the restrictions placed upon registered vendors.

A current system of product tracking employs a method of covertly encoding each container with the identity of the scheduled retailer prior to shipment. However, once the retailer is aware of the presence of the mark, the mark has only to be removed to circumvent the system. If it were possible to provide each container with a truly indelible identification, possibly in the form of a machine readable code such as a bar code, the system would not be so easily overcome and would no longer depend on the covert nature of the mark. Thus, a bar code could be openly applied to the container and, if desired, to its closure, thereby linking the two uniquely. As the filled container progresses to the packing stage, the bar code could be read and copied to subsequent packaging materials by means of a printing, inscribing, engraving or similar process, until both the product and packaging are ready for onward shipment. At this point it would be customary for the shipping destination to be marked on the pack, but if the proposed identification code were machine readable, it could be read at the point at which the identity of the retailer is marked on the pack, and the two correlated by a simple software package. In this way, no matter what is done to the outer packaging, the unique relationship between the product and its intended retailer could still be established from the indelible markings on the container itself.

In the past in order to produce an indelible mark, manufacturers have relied almost exclusively on surface marking. However, the problem with this type of marking is that it may either be destroyed by removing that part of the surface on which the mark is applied or be imitated by the application of an identical mark on a substitute container. In contrast it is an object of the present invention to provide a method of sub-surface marking using a high energy density beam in which the mark is spaced from the surface of the body concerned. Such a mark has the advantage of not only being able to withstand any subsequent surface treatment but also of being very difficult to imitate.

It is known to mark containers using laser radiation but the marks produced often take the form of an engraving or a detectable colour change at a particular surface. For example, U.S. Pat. No. 4,758,703 describes a method of covertly encoding a microscopically visible pattern on a surface of an object in which a beam of unfocused laser radiation is passed through a mask to produce the desired pattern, the intensity of the laser beam being carefully controlled so that the pattern is barely etched onto the surface and remains invisible to the naked eye. U.S. Pat. No. 4,769,310, on the other hand, describes a method of marking ceramic materials, glazes, glass ceramics and glasses that contain at least one radiation-sensitive additive in which a laser beam is focused onto the surface of the material to be marked so as to induce a colour change within the irradiated area.

In contrast, U.S. Pat. No. 3,657,085 describes a method of sub-surface marking using an electron beam but also mentions the possibility of using a laser beam as an alternative. The object of this U.S. patent is to provide a method of marking an article such as a spectacle lens with an identification mark which is normally invisible but which can be rendered visible when required. To this end, the electron or laser beam is focused onto a mask placed over the spectacle lens so that the beam passing through the cut out portions of the mask impinges upon the material of the spectacle lens. The beam is scattered by collisions with the molecules of the material that makes up the lens, with the result that the kinetic energy of the beam is absorbed as heat producing permanent stress patterns within the lens. The stress patterns are invisible to the naked eye but may be rendered visible by double refraction in polarised light.

SUMMARY OF THE INVENTION

According to a first aspect of the present invention, there is provided a method of providing a body of material with a sub-surface mark comprising the steps of directing at a surface of the body a high energy density beam to which the material is transparent and bringing the beam to a focus at a location spaced from the surface and within the body so as to cause localised ionisation of the material and the creation of a mark in the form of an area of increased opacity to electromagnetic radiation substantially without any detectable change at the surface.

For the avoidance of doubt, the term "transparent" as used herein with reference to a material refers to a material in which the high energy density beam can penetrate at least to the depth of the desired mark and as such includes translucent materials and materials such as coloured or smoked glass in which the transmission characteristic to electromagnetic radiation at wavelengths in the visible region has been reduced but not eliminated. The term "transparent" also includes materials which are opaque to electromagnetic radiation at wavelengths in the visible region but which are at least capable of transmitting electromagnetic radiation at wavelengths within the same region of the electromagnetic spectrum as that of the high energy density beam.

In a preferred embodiment, the body of material is transparent to electromagnetic radiation at wavelengths within the visible region, thereby rendering the mark visible to the naked eye. For example, the material may be of glass or plastic. In an alternative embodiment, the material is opaque to electromagnetic radiation at wavelengths in the visible region so that the mark is hidden to the naked eye but may be "seen" by optical instruments operating at an appropriate wavelength within the electromagnetic spectrum such as that of the high energy density beam. While such a mark does not possess the deterrent effect of its visible counterpart, it does represent a truly indelible covert mark.

In either of the foregoing embodiments, the focus of the beam may be movable relative to the body to be marked so as to enable the mark to be of a predetermined shape. For example, the mark may be three dimensional and/or may comprise one or more numerals, letters or symbols, or a combination thereof, which in turn may represent an identification, a trade mark, a machine readable code or any other desired indicium.

According to a second aspect of the present invention, there is provided an apparatus for providing a body of material with a sub-surface mark comprising means for creating a high energy density beam to which the material is transparent and means for bringing the beam to a focus at a location within the body and spaced from a surface thereof so as to cause localised ionisation of the material and the creation of a mark in the form of an area of increased opacity to electromagnetic radiation substantially without any detectable change at the surface.

While it will be appreciated that the high energy density beam may be a focusable particle beam, such as an electron beam, having sufficient energy to cause localised ionisation within the body of the material, in a preferred embodiment the means for creating the high energy density beam is a laser.

The possible types of interaction between laser radiation and a body of material may be categorised under three headings dependent upon the power density of the laser radiation concerned. In order of increasing power density, these headings are as follows:

(1) Photochemical interactions including photoinduction or photoactivation;
(2) Thermal interactions in which the incident radiation is absorbed as heat; and
(3) Ionising interactions which involve the non-thermal photodecomposition of the irradiated material.

The difference between the thresholds of these three interactions is clearly demonstrated by comparing the typical power density of $10^{-3}$ W/cm$^2$ required to produce a photochemical interaction with the power density of $10^{12}$ W/cm$^2$ typical of ionisation interactions such as photoablation and photodisruption.

For localised ionisation of the material to take place, the beam must possess sufficient energy to cleave molecular bonds and create a plasma at the point of focus. Once the beam has been removed, the plasma cools to form a localised zone of damage or disruption which scatters any electromagnetic radiation that is incident upon it, with the result that the zone appears as an area of increased opacity.

At present, the only commercially available lasers capable of inducing ionisation interactions are pulsed lasers having a peak energy that, when focused, is sufficient to create a plasma within the material concerned. In a preferred embodiment of the present invention the power density of the laser at the focus is at least $10^7$ W/cm$^2$ and the pulse duration no more than $10^{-6}$ seconds so that the energy density of each pulse is at least 10 J/cm$^2$ and sufficient to induce localised ionisation of the material at the focus of the beam.

If the body of material to be marked is transparent to electromagnetic radiation at wavelengths within the visible region, then the means for creating the required high energy density beam is preferably a Nd-YAG (neodymium-doped yttrium aluminium garnet) laser operating at a wavelength of 1.06 μm.

Advantageously, means may be provided to move the focus of the beam relative to the body, and in particular the means may comprise at least one movable mirror disposed in the path of the beam. The movement of the mirror may be controlled by a computer program enabling the final shape of the mark to be easily manipulated, while the movable mirror itself may comprise a galvanometer mirror. While it is recognised that any suitable means may be provided to move the mirror, such as a servo motor or a manual joystick, the properties of a galvanometer mirror provide a speed of response and an ease of control that represent a significant advantage over alternative control means.

In another embodiment, the means for bringing the beam to a focus may include a lens element of variable focal length either in the form of a correcting lens that focuses the beam at the same depth within the body irrespective of any curvature of the surface thereof, or in the form of a zoom lens so that marks may be made at different depths within the body and so may allow for the creation of three dimensional marks.

In yet a further embodiment, a secondary source of visible laser radiation may be provided to facilitate the alignment of the high energy density beam.

According to a third aspect of the present invention, there is provided a marked body of material in which the mark comprises an internal zone of damage spaced from a surface of the body as a result of localised ionisation.

In a preferred embodiment, the body of material is transparent to electromagnetic radiation at wavelengths within the visible region, thereby rendering the mark visible to the naked eye. For example, the material may be of glass or plastic. In an alternative embodiment, however, the body of material is opaque to electromagnetic radiation at wavelengths within the visible region so that the mark is hidden to the naked eye but may be "seen" by optical instruments operating at an appropriate wavelength within the electromagnetic spectrum.

The mark may be three dimensional and/or may comprise one or more numerals, letters or symbols or a combination thereof while advantageously, the body of material may comprise a container.

BRIEF DESCRIPTION OF THE DRAWINGS

An embodiment of the present invention will now be described, by way of example, with reference to the accompanying drawings, in which.

DETAILED DESCRIPTION OF A PREFERRED EMBODIMENT

Figure 1:
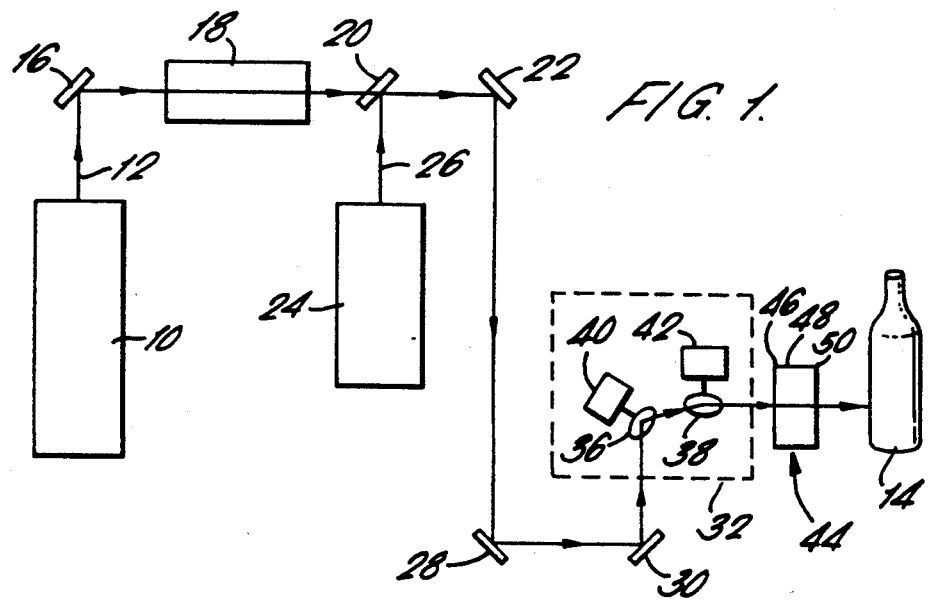
FIG. 1 is a schematic diagram of an apparatus in accordance with the second aspect of the present invention.

As can be seen from FIG. 1, a source 10 produces a beam of laser radiation 12 which is directed so as to impinge upon a body of material 14 which, in the present example, is in the form of a bottle. Since the eventual sub-surface mark is intended to be visible to the naked eye, the bottle 14 is chosen, to be of a material such as glass or plastic, that is transparent to electromagnetic radiation within the visible region of the electromagnetic spectrum. Furthermore, the source 10 is selected in such a way that the material of the bottle 14 is similarly transparent to the beam of laser radiation 12 that it produces.

In the apparatus shown, the source 10 comprises a high energy density, pulsed Nd-YAG (neodymium-doped yttrium aluminium garnet) laser that emits a pulsed beam of laser radiation 12 with a wavelength of 1.06 μm that is consequently invisible to the naked eye. Once emitted from the Nd-YAG laser 10, the pulsed beam 12 is incident upon a first reflecting surface 16 that directs the beam 12 through a beam expander 18 and a beam combiner 20 to a second reflecting surface 24 22. A second source of laser radiation, in the form of a low power He-Ne (Helium-Neon) laser, is disposed adjacent to the Nd-YAG laser 10 and emits a secondary beam of visible laser radiation 26 with a wavelength of 638 nm. The secondary beam 26 impinges upon the beam combiner 20 where it is reflected toward the second reflecting surface 22 coincident with the pulsed beam of laser radiation 12 from the Nd-YAG laser 10. Thus, the necessary properties of the beam combiner 20 are that it should transmit electromagnetic radiation with a wavelength of 1.06 μm whilst reflecting electromagnetic radiation with a wavelength of 638 nm. In this way the He—Ne laser beam 26 provides the combined He—Ne/Nd-YAG beam 12, 26 with a visible component that facilitates optical alignment.

Figure 2:
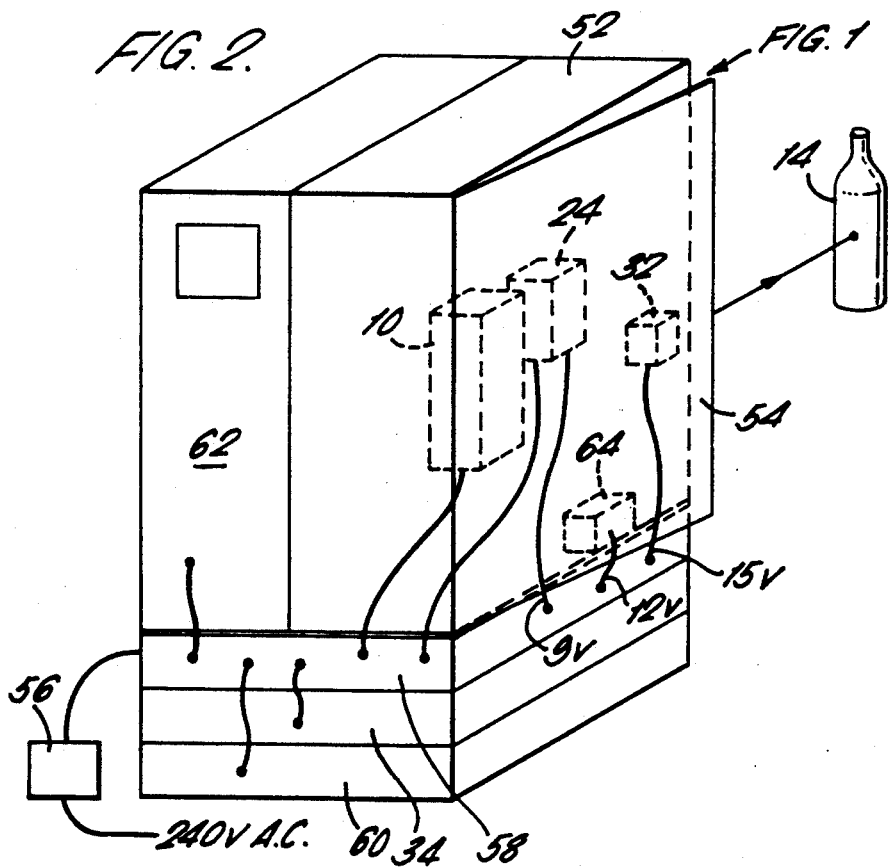
FIG. 2 is a schematic diagram of the way in which electrical power is distributed throughout the apparatus of FIG. 1.

Having been combined, the two coincident beams 12, 26 are reflected at the second reflecting surface 22 toward a third reflecting surface 28 and from the third reflecting surface 28 are further reflected toward a fourth reflecting surface 30. From the fourth reflecting surface 30 the combined beam 12, 26 is reflected yet again toward a head unit 32 from whence the combined beam 12, 26 is finally directed toward the bottle 14. In order to facilitate marking at different heights from the base of the bottle 14, the third and fourth reflecting surfaces 28 and 30 are integrally mounted, together with the head unit 32, so as to be adjustable in a vertical plane under the action of a stepping motor 34 (FIG. 2).

Within the head unit 32 the combined He-Ne/Nd-YAG beam 12, 26 is sequentially incident upon two movable mirrors 36 and 38. The first of the two mirrors 36 is disposed so as to be inclined to the combined beam 12, 26 that is incident upon it as a result of reflection from the fourth reflecting surface 30 and is movable in such a way as to cause the beam reflected therefrom to move in a vertical plane. The second of the two mirrors 38 is similarly inclined, this time to the beam 12, 26 that is incident upon it as a result of reflection from the first mirror 36, and is movable in such a way as to cause the reflected beam 12, 26 to move in a horizontal plane. Consequently it will be apparent to those skilled in the art that the beam 12, 26 emerging from the head unit 32 may be moved in any desired direction by the simultaneous movement of the first and second mirrors 36 and 38. In order to facilitate this movement the two movable mirrors 36 and 38 are mounted on respective first and second galvanometers 40 and 42. Whilst it is recognised that any suitable means may be provided to control the movement of the two mirrors 36 and 38, such as the use of individual servo motors or a manual joystick, the approach adopted combines a speed of response with an ease of control that represents a significant advantage over alternative control means.

Emerging from the head unit 32, the combined beam 12, 26 is focused by passing through a lens assembly 44 which may include one or more lens elements. A first lens element 46 brings the beam 12, 26 to a focus at a chosen point spaced from the surface of the bottle 14 within the thickness of the glass or plastic material from which the bottle 14 is made. As is well known, the maximum power density of the beam 12, 26 is inversely proportional to the square of the radius of the beam 12, 26 at its focus which in turn is inversely proportional to the radius of the beam 12, 26 that is incident upon the focusing lens 46. Thus for a beam 12, 26 of electromagnetic radiation of wavelength λ and radius R that is incident upon a lens of focal length f, the power density E at the focus, is to a first approximation, given by the expression $$E = \frac{PR^2}{\lambda^2 f^2} \text{ Watts/meter}^2$$

where P is the power produced by the laser. From this expression the value and purpose of the beam expander 18 is readily apparent since increasing the radius of the beam R serves to increase the power density E of the focus. In addition, the lens element 46 is typically a short focal length lens having a focal length in the range between 20 mm and 100 mm so that typical power densities at the focus of the beam 12, 26 are in excess of $10^7$ W/cm$^2$. If the pulse duration of the Nd-YAG laser 10 is maintained at no more $10^6$ seconds then this power density equates to an energy density of at least 10 J/cm$^2$. At energy densities of this order localised ionisation occurs within the glass or plastic material at the focus of the incident beam 12, 26 resulting in the creation of a zone of damage which scatters any electromagnetic radiation that is incident upon it, with the result that the zone appears as a mark in the form of an area of increased opacity substantially without causing any detectable change at the surface of the bottle 14. By moving the focus of the beam 12, 26 using the mirrors 36 and 38 the mark may be made to a predetermined shape and in particular, may be made to comprise one or more numerals, letters or symbols, or a combination thereof which in turn may represent an identification, a trade mark, a machine readable code or any other desired indicium.

A second lens element 48 may be placed in series with the focusing lens element 46 in order to compensate for any curvature of the surface of the bottle 14. It will be recognised that such a correcting lens will not be required if the body to be marked 14 presents a substantially planar surface to the incident beam and the need for such an element may be negated altogether if the first element 46 is of variable focal length and comprises, for example, a flat field lens. However, it is to be noted that this use of one or more optical elements is a particularly simple and elegant way of ensuring that a mark is made at a constant depth within the body 14 irrespective of any curvature of its surface.

If the thickness of the body to be marked 14 allows, a third lens element 50 in the form of a zoom lens may also be included in the lens assembly 44 and thereby facilitate the creation of three dimensional marks within the material of the body 14.

In the interest of safety, the two lasers 10 and 24 and their respective beams 12 and 26 are enclosed within a safety chamber 52 as shown in FIG. 2 with the combined beam 12, 26 emerging from the safety chamber 52 only after passing through the lens assembly 44. Access to the two lasers 10 and 24 and the various optical elements disposed in the path of the respective beams 12, 26 is gained by means of a door panel 54 which is fitted with an interlock 56 that prevents the operation of the pulsed Nd-YAG laser 10 while the door panel 54 is open. It is to be noted that the He—Ne laser 24 need not necessarily be fitted with an interlock in the same way since it only operates at a very low power and does not represent a significant danger to a skilled operator. The power of the combined beam 12, 26 is in fact so overwhelming due to the pulsed Nd-YAG laser 10 that once the He—Ne laser 24 has been used to align the necessary optical elements it may be switched off prior to the marking of the body 14.

A single phase electrical mains supply of 240 volts is fed via the door panel interlock 56 to a mains distribution unit 58 that is disposed below, and isolated from, the safety chamber 52 in order to prevent any electrical effects interfering with the operation of the lasers 10 and 24. From the distribution unit 58 mains electrical power is provided to the pulsed Nd-YAG laser 10 and the He-Ne laser 24, as well as to a chiller unit 60 that serves to cool the pulsed Nd-YAG laser 10. In addition, mains electrical power is also supplied to the stepping motor 34 and to a computer 62. Three AC/DC convertors and associated voltage regulators provide regulated DC voltage supplies of 9 v, 12 v and 15 v that are fed respectively to the He-Ne laser 24 to facilitate the pumping mechanism, to a further interlock 64 that prevents premature firing of the pulsed Nd-YAG laser 10, and to the head unit 32, and in particular to the first and second galvanometers 40 and 42 therein to produce a predetermined movement of the first and second mirrors 36 and 38.

In order to produce a mark of a desired shape within the body 14, the 15 v DC supply is modulated by means of the computer 62 so as to produce a series of movements of the first and second galvanometer mirrors 36 and 38 in accordance with a predetermined computer program. Since the movement of the two mirrors 36 and 38 controls the position of the focus, by coordinating the pulsing of the Nd-YAG laser with the movement of the two mirrors 36 and 38 an area of localised ionisation can be produced to the desired shape. The computer 62 may also be used to control the zoom lens 50, if such is provided, enabling the mark to become three dimensional as the beam 12, 26 is focused at different depths within the body of the material 14.

We claim:

1. A method of forming a sub-surface mark within a body, at least a portion of said body being of a material to be marked, said method comprising the steps of:
   (a) directing at said portion a high energy density beam to which the material is transparent; and
   (b) focusing the beam at a location in the material, within said portion, and spaced from the surfaces of said portion so as to cause localised ionisation of the material at said location and the creation at said location of a mark in the form of an area of increased opacity to electromagnetic radiation, substantially without any detectable change at said surfaces or at the surfaces of said body.

2. A method in accordance with claim 1, wherein the body is transparent to electromagnetic radiation at wavelengths within the visible region.

3. A method in accordance with claim 1, wherein at least a portion of the body is opaque to electromagnetic radiation at wavelengths within the visible region such that the mark may only be detected by optical instruments operating at an appropriate wavelength within the electromagnetic spectrum.

4. A method in accordance with claim 1, wherein step (b) includes moving the focus of the beam relative to said portion so as to create the mark with a predetermined shape.

5. A method in accordance with claim 4, wherein the mark is three dimensional.

6. A method in accordance with claim 4 or claim 5, wherein the mark comprises one or more numerals, letters or symbols, or a combination thereof.

7. An apparatus for forming a sub-surface mark within a body, at least a portion of said body being of a material to be marked, said apparatus comprising:
   means for creating a high energy density beam to which the material is transparent; and
   means for focusing the beam at a location in the material, within said portion, and spaced from the surfaces of said portion so as to cause localised ionisation of the material at said location and the creation at said location of a mark in the form of an area of increased opacity to electromagnetic radiation, substantially without any detectable change at said surfaces or at the surfaces of said body.

8. An apparatus in accordance with claim 7, wherein the high energy density beam is a focusable particle beam.

9. An apparatus in accordance with claim 7, wherein the means for creating a high energy density beam is a laser.

10. An apparatus in accordance with claim 9, wherein the laser has a peak energy density at the focus of at least 10 $J/cm^2$.

11. An apparatus in accordance with claim 9 or claim 10, wherein the laser has a power density at the focus of at least $10^7$ $W/cm^2$ and is pulsed with a pulse duration of less than $10^{-6}$ seconds.

12. An apparatus in accordance with claim 9, wherein the laser is a Nd-YAG laser.

13. An apparatus in accordance with claim 9, further comprising means for moving the focus of the beam relative to said portion so as to create the mark with a predetermined shape.

14. An apparatus in accordance with claim 13, wherein the means for moving the focus of the beam includes at least one movable mirror disposed in the path of the beam.

15. An apparatus in accordance with claim 14, wherein the means for moving the focus further includes a programmed computer for controlling the movement of the at least one movable mirror.

16. An apparatus in accordance with claim 14 or claim 15, wherein the at least one movable mirror is a galvanometer mirror.

17. An apparatus in accordance with claim 9, wherein the means for focusing the beam includes a lens element of variable focal length.

18. An apparatus in accordance with claim 9, further comprising a secondary source of visible laser radiation for facilitating alignment of the high energy density beam.

19. An article of manufacture comprising a at least a portion of said body being of a material having an internal zone of damage resulting from localized ionization and spaced from the surfaces of said portion and the surfaces of said body to form a mark within said portion.

20. An article of manufacture in accordance with claim 19, wherein the body is transparent to electromagnetic radiation at wavelengths within the visible region.

21. An article of manufacture in accordance with claim 20, wherein the body is glass or plastic.

22. An article of manufacture in accordance with claim 19, wherein at least a portion of the body is opaque to electromagnetic radiation at wavelengths within the visible region such that the mark may only be detected by optical instruments operating at an appropriate wavelength within the electromagnetic spectrum.

23. An article of manufacture in accordance with claim 19, wherein the mark is three dimensional.

24. An article of manufacture in accordance with claim 19, wherein the mark comprises one or more numerals, letters or symbols, or a combination thereof.

25. An article of manufacture in accordance with claim 19, wherein the article is a container.

* * * * *

(12) REEXAMINATION CERTIFICATE (4672nd)
United States Patent
Clement et al.

(10) Number: US 5,206,496 C1
(45) Certificate Issued: Nov. 19, 2002

(54) SUB-SURFACE MARKING

(75) Inventors: Robert M. Clement, Swansea (GB); Neville R. Ledger, Swansea (GB); Robert P. Sunman, Cardiff (GB)

(73) Assignee: United Distillers PLC, Edinburgh (GB)

Reexamination Request:
No. 90/005,794, Aug. 16, 2000

Reexamination Certificate for:
Patent No.: 5,206,496
Issued: Apr. 27, 1993
Appl. No.: 07/745,170
Filed: Aug. 15, 1991 07/745,170

(30) Foreign Application Priority Data

Aug. 15, 1990 (GB) ................................................ 9017939
Sep. 12, 1990 (GB) ................................................ 9019929
Nov. 27, 1990 (GB) ................................................ 9025790

(51) Int. Cl.$^7$ ........................................................ G06K 7/10
(52) U.S. Cl. ................................... 250/271; 219/121.6
(58) Field of Search .................... 250/271; 219/121.6, 219/121.65, 121.66, 121.85; 427/572, 573, 595, 596

(56) References Cited

U.S. PATENT DOCUMENTS

| 3,657,085 A | 4/1972 | Hoffmeister et al. |
| 3,710,798 A | 1/1973 | Bredemeier ............... 128/303.1 |
| 3,715,734 A | 2/1973 | Fajans .................... 340/173 M |
| 4,092,518 A | 5/1978 | Merard |
| 4,174,154 A | 11/1979 | Kawasaki |
| 4,190,759 A | 2/1980 | Hongo et al. ......... 219/121 LM |
| 4,289,378 A | 9/1981 | Remy et al. ................. 350/174 |
| 4,309,998 A | 1/1982 | Aron nee Rosa et al. |
| 4,405,852 A | 9/1983 | Bononi |
| 4,425,769 A | 1/1984 | Hakoune |
| 4,467,172 A | 8/1984 | Ehrenwald et al. ... 219/121 LH |
| 4,480,169 A | 10/1984 | Macken |
| 4,538,608 A | 9/1985 | L'Esperance, Jr. ....... 128/303.1 |
| 4,598,039 A | 7/1986 | Fischer |
| 4,651,283 A | 3/1987 | Sciaky |
| 4,744,647 A | 5/1988 | Meshel et al. ............... 351/177 |
| 4,753,863 A | 6/1988 | Spanjer ....................... 430/138 |
| 4,810,434 A | 3/1989 | Caines |
| 4,843,207 A | 6/1989 | Urbanek et al. ......... 219/121.6 |
| 4,853,163 A | 8/1989 | Mendonca, Jr. et al. |
| 4,901,718 A | 2/1990 | Bille et al. ........................ 60/4 |
| 4,914,270 A | 4/1990 | Copley, et al. |
| 4,925,523 A | 5/1990 | Braren et al. ................ 156/643 |
| 4,942,000 A | 7/1990 | Penoyer |
| 4,950,862 A | 8/1990 | Kajikawa |

FOREIGN PATENT DOCUMENTS

| DE | 3425263 A1 | 1/1985 |
| DE | 237 972 A3 | 8/1986 |
| JP | 63-144889 | 6/1988 |
| SU | 321422 | 1/1972 |

OTHER PUBLICATIONS

Smith, W. Lee, Bechtel, J. H. and Bloembergen N., "Picosecond Laser–Induced Damage Morphology: Spatially Resolved Microscopic Plasma Sites." *Optics Communications*, vol. 18. No. 4 (Sep. 1976) pp. 592–596.

(List continued on next page.)

Primary Examiner—Kiet T. Nguyen

(57) ABSTRACT

A method and apparatus for providing a body of material (14) with sub-surface marking in the form of an area of increased opacity to electromagnetic radiation. The method includes directing at a surface of the body (14) a high energy density beam (12, 26) to which the material (14) is transparent, and bringing the beam (12,26) to a focus at a location spaced from the surface and within the body (14) so as to cause localized ionization of the material (14). In a prefered embodiment the apparatus includes a laser (10) as a high energy density beam source and provides means (36, 38) to move the focus of the beam (12,26) relative to the body (14) so as to enable the mark to be of a predetermined shape.

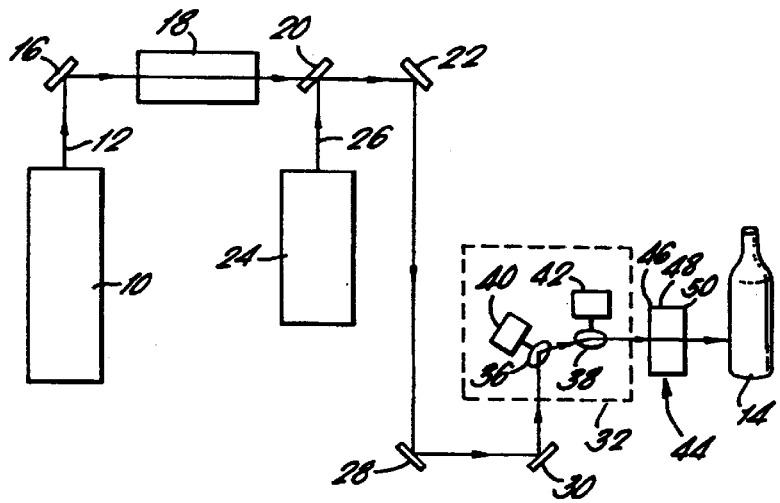

OTHER PUBLICATIONS

Adams, R. L. and March, W. F., "Visualization of Optical Breakdown Phenomena" in "Correspondence" section, *Ophthalmic Surgery*, vol. 18, No. 3 (Mar., 1987), pp. 236 and 239.

Moretti, M., "Computer Controls Laser Beam." *Laser Focus/Electro–Optics Technology* (Jan., 1988) p. 32.

Glass A. J. and Guenther A. H., "Laser Induced Damage of Optical Elements—a Status Report", *Applied Optics*, vol. 12, No. 4 (Apr. 1973), pp. 637–649.

Fradin, D. W., Yablonovitch, E. and Bass, M., "Confirmation of an Electron Avalanche Causing Laser–induced Bulk Damage at 1.06 $\mu$m", *Applied Optics*, vol. 12, No. 4, (Apr. 1973), pp. 700–709.

Leung, K, M., Bass, M., and Balbin–Villaverde, A. G. J., "Damage to 10.6 $\mu$m Window Materials Due to $CO_2$ TEA Laser Pulses" in: *Laser Induced Damage in Optical Materials: 1975*, (U.S. Dept. of Commerce, National Bureau of Standards, 1976) pp. 107–117.

Smith, W. L., Bechtel, J. H. and Bloembergen, N., "Picosecond Breakdown Studies: Threshold and Nonlinear Refractive Index Measurements and Damage Morphology" in: *Laser Induced Damage in Optical Materials: 1975*, (U.S. Dept. of Commerce, National Bureau of Standards, 1976) pp. 321–330.

Milam, D., Bradbury, R. A., and Picard, R. H., "A Statistical Analysis of Laser Induced Gas Breakdown—A Test of the Lucky Electron Theory of Avalanche Formation" in: *Laser Induced Damage in Optical Materials: 1975*, (U.S. Dept. of Commerce, National Bureau of Standards, 1976), pp. 347–355.

Duthler, C. J. and Sparks, M., "Irradiance Limits for Vacuum Ultraviolet Material Failure" in: *Laser Induced Damage in Optical Materials: 1975*, (U.S. Dept. of Commerce, National Bureau of Standards, 1976), pp. 395–405.

Sliney Jr., J. G. and DeShazer, L. G., "Temperature and Concentration Dependence of Laser Bulk Damage to Neodymium Glass" in: *Laser Induced Damage in Optical Materials: 1977*, (U.S. Dept. of Commerce, National Bureau of Standards, 1977), pp. 399–409.

Manenkov, A. A., "New Results on Avalanche Ionization as a Laser Damage Mechanism in Transparent Solids" in: *Laser Induced Damage in Optical Materials: 1977*, (U.S. Dept. of Commerce, National Bureau of Standards, 1977), pp. 455–464.

Schmid, A., Kelly, P. and Bräunlich, P., "Multiphoton Theory of Otical Breakdown in Alkali Halides", in: *Laser Induced Damage in Optical Materials: 1977*, (U.S. Dept. of Commerce, National Bureau of Standards, 1977), pp. 465–472.

Liu, P., Smith, W. L., Lotem, H., Bechtel, J. H., Bloembergen, N., and Adhav, R. S., "Absolute Two–Photon Absorption Coefficients at 355 and 266 nm" in: *Laser Induced Damage in Optical Materials: 1977*, (U.S. Dept. of Commerce, National Bureau of Standards, 1977), pp. 489–495.

Ready, J. F., "Care and Maintenance of Lasers" in: *Industrial Applications of Lasers* (Academic Press, New York, 1978), excerpt pp. 145–151.

Smith, W. L., "Laser–Induced Breakdown in Optical Materials." *Optical Engineering*, vol. 17, No. 5 (Sep.–Oct., 1978), pp. 489–503.

Bennett, H. E., Glass, A. J., Guenther, A. H., and Newnam, B., "Laser Induced Damage in Optical Materials: Twelfth ASTM Symposium." *Applied Optics*, vol. 20, No. 17, pp. 3003–3019 (Sep. 1, 1981).

Keates, R. H., Fry, S. M., and Link, W. J., "Laser Fundamentals", "Nd: YAG Ophthalmic Lasers" and the "Appendix" in *Ophthalmic Neodymium YAG Lasers* (Slack, Inc., Thorofare, New Jersey, 1983) pp. 1–15 and 39–49.

Bennett, H. E, Glass, A. J., Guenther, A. H., Milam, D. and Newnam, B., "Materials and Measurements" section in "Laser Induced Damage in Optical Materials: Fourteenth ASTM Symposium." *Applied Optics*, vol. 23, No. 21, exerpt pp. 3782, 3784–3786 (Nov. 1, 1984).

Koechner, W., "Damage of Optical Elements" in: *Solid–State Laser Engineering*, (vol. 1 of Springer Series in Optical Sciences), (Springer–Verlag, Berlin, 1988) pp. 540–558.

"Laser Light: A New Visual Art" (Cincinnati Art Museum and the Laser Laboratory of the University of Cincinnati Medical Center, Cincinnati, Ohio, 1969) pp. 5–9, 29 and 31.

"Enthusiasm Greets Art Show." *The Ohio State Medical Journal*, vol. 48 (Sep., 1972), pp. 891–894.

Goldman, L. (M.D.), "Laser Art and Music" in: *Applications of the Laser*, (Robert E. Krieger Publishing Co., Florida, reprint ed. 1982), pp. 209–223.

Journal of the Optical Society of America, 1964, vol. 54, No. 4, p. 563, WF15, Marc S. Bruma.

Banic, J., Sizgoric, S. and O'Neil, R., "Airborne Scanning Lidat Bathymeter Measures Water Depth." *Laser Focus/Electro–Optics Technology* (Feb., 1987) pp. 48, 50, 52 ("Banic et al.").

"FLIR Design Cuts Size, Weight, Cost." *Laser Focus/Electro–Optics Technology* (Mar., 1987). pp. 54, 56, 58.

Richard, W. M., "Multiwavelength Test Bench Measures Scan Lens Properties." *Laser Focus/Electro–Optics Technology* (Jan. 1988) pp. 120, 122 and 126.

"Portable Medical YAG Laser System Appears on the Scene." *Laser Focus/Electro–Optics Technology* (Apr., 1987) pp. 38 and 40.

Wood, R. M., "Laser Damage in Optical Materials", *The Adam Hilger Series on Optics and Optoelectronics*, IOP Publishing Limited 1986, Accord, MA.

"Firm Offers Clear View of Toilets, Gift Items", *Wichita Business Journal*, vol. 2, No. 46, Jan. 25, 1988.

Snitzer, E., "Glass Lasers", *1969 IEEE International Convention Digest* 1969 IEEE International Convention, Mar. 24–27, 1969, New York, NY, pp. 306–307.

Stickley, C.M., et al., "Color Centers and Ruby–Laser Output–Energy Degradation", *Journal of Applied Physics*, vol. 40, No. 4, Mar. 15, 1969, pp. 1792–1802.

Young, C.G. et al., "Laser–Induced Damage in Glass" *Symposium presented by American Society for Testing and Materials*, Boulder, Colorado, Jun. 20, 1969, pp. 84–99 and 116.

"Damage in Transparent Materials", Chapter 6, pp. 278, 284, 285.

*Laser Microfabrication: Thin Film Processes and Lithography* edited by Ehrlich, Daniel J. et al., 1989 Academic Press, Inc., San Diego, CA pp. 45–50, 231–283.

Gibilisco, S., *Understanding Lasers*, 1989 TAB Books, Inc., Blue Ridge Summit, PA, pp. 93–119.

Iannini, R. E., *Build your Own Working Fiberoptic Infrared and Laser Space–Age Projects*, 1987 TAB Books, Inc., Blue Ridge Summit, PA, pp. 183–214.

Weiner, M. J. "Product Marking with ND:YAG and $CO_2$ Lasers", Industrial Applications of High Power Laser Technology, Proceedings of the Society of Photo–Optical Instrumentation Engineers, vol. 86, Aug. 24–25, 1974, San Diego, CA, pp. 23–29.

Bernard, B., "Programmable Laser Marking System", Laser 79 Opto–Electronics, Munich Jul. 2–6, 1979 Conference Proceedings, IPC Science and Technology Press, pp. 235–239.

British Standard, *Radiation safety of laser product and systems—Part 3. Guidance for Users*, BS 4803, Part 3, 1983, pp. 1–30.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7 and 19 are determined to be patentable as amended.

Claims 2–6, 8–18 and 20–25 dependent on an amended claim, are determined to be patentable.

New claims 26–52 are added and determined to be patentable.

1. A method of forming a sub-surface mark within a body, at least a portion of said body being of a material to be marked, said method comprising the steps of:
   (a) directing at said portion a high energy density beam to which the material is transparent: [and]
   (b) focusing the beam at a location in the material, within said portion, and spaced from the surfaces of said portion [so as to cause]; *and*
   (c) *creating a plasma by* localised ionisation of the material at said location [and the creation] *to create* at said location [of] a mark in the form of an area of increased opacity to electromagnetic radiation, substantially without any detectable change at said surfaces or at the surfaces of said body.

7. An apparatus for forming a sub-surface mark within a body, at least a portion of said body being of a material to be marked, said apparatus comprising:
   means for creating a high energy density beam to which the material is transparent; and
   means for focusing the beam at a location in the material, within said portion, and spaced from the surfaces of said portion so as to cause *a plasma by* localised ionisation of the material at said location and the creation at said location of a mark in the form of an area of increased opacity to electromagnetic radiation, substantially without any detectable change at said surfaces or at the surfaces of said body.

19. An article of manufacture comprising a *body,* at least a portion of said body being of a material having an internal zone of damage resulting from *creation of a plasma by* localized ionization and spaced from the surfaces of said portion and the surfaces of said body to form a mark within said portion.

*26. A method of forming a sub-surface mark within a body, at least a portion of said body being of a material to be marked, said method comprising the steps of:*
   *(a) directing at said portion a high energy density beam to which the material is transparent;*
   *(b) focusing the beam at a location in the material, within said portion, and spaced from the surfaces of said portion;*
   *(c) creating a plasma by localised ionisation of the material at said location to create at said location a mark in the form of an area of increased opacity to electromagnetic radiation, substantially without any detectable change at said surfaces or at the surfaces of said body, the mark including at least one from the group of numerals, letters, and symbols that is representative of a desired indicium; and*
   *(d) moving the focus of the beam relative to said portion so as to create the mark with a predetermined shape.*

*27. A method in accordance with claim 26, wherein the body is transparent to electromagnetic radiation at wavelengths within the visible region.*

*28. A method in accordance with claim 26, wherein at least a portion of the body is opaque to electromagnetic radiation at wavelengths within the visible region such that the mark may only be detected by optical instruments operating at an appropriate wavelength within the electromagnetic spectrum.*

*29. A method in accordance with claim 26, wherein the mark is three dimensional.*

*30. An apparatus for forming a sub-surface mark within a body, at least a portion of said body being of a material to be marked, said apparatus comprising:*
   *means for creating a high energy density beam to which the material is transparent;*
   *means for focusing the beam at a location in the material, within said portion, and spaced from the surfaces of said portion so as to cause a plasma by localised ionisation of the material at said location and the creation at said location of a mark in the form of an area of increased opacity to electromagnetic radiation, substantially without any detectable change at said surfaces or at the surfaces of said body, the mark including at least one from the group of numerals, letters and symbols that is representative of a desired indicium; and*
   *means for moving the focus of the beam relative to said portion so as to create the mark with a predetermined shape.*

*31. An apparatus in accordance with claim 30, wherein the high energy density beam is a focusable particle beam.*

*32. An apparatus in accordance with claim 30, wherein the means for creating a high energy density beam is a laser.*

*33. An apparatus in accordance with claim 32, wherein the laser has a peak energy density at the focus of at least $10 \text{ J/cm}^2$.*

*34. An apparatus in accordance with claim 32 or claim 33, wherein the laser has a power density at the focus of at least $10^7 \text{ W/cm}^2$ and is pulsed with a pulse duration of less than $10^{-6}$ seconds.*

*35. An apparatus in accordance with claim 32, wherein the laser is a Nd-YAG laser.*

*36. An apparatus in accordance with claim 32, wherein the means for focusing the beam includes a lens element of variable focal length.*

*37. An apparatus in accordance with claim 32, further comprising a secondary source of visible laser radiation for facilitating alignment of the high energy density beam.*

*38. An apparatus in accordance with claim 30, wherein the means for moving the focus of the beam includes at least one movable mirror disposed in the path of the beam.*

*39. An apparatus in accordance with claim 38, wherein the means for moving the focus further includes a programmed computer for controlling the movement of the at least one movable mirror.*

*40. An apparatus in accordance with claim 38 or claim 39, wherein the at least one movable mirror is a galvanometer mirror.*

41. An article of manufacture, comprising:

a body of material having at least a portion with an internal zone of damage resulting from a plasma created by localized ionization, the internal zone of damage being spaced from the surfaces of the portion and the surfaces of the body to form a mark within the portion, the mark having an area of increased opacity to electromagnetic radiation substantially without any detectable change to the surface, the mark including at least one from the group of numerals, letters and symbols that is representative of a desired indicium.

42. An article of manufacture in accordance with claim 41, wherein the body is transparent to electromagnetic radiation at wavelengths within the visible region.

43. An article of manufacture in accordance with claim 41, wherein the body is glass or plastic.

44. An article of manufacture in accordance with claim 41, wherein at least a portion of the body is opaque to electromagnetic radiation at wavelengths within the visible region such that the mark may only be detected by optical instruments operating at an appropriate wavelength within the electromagnetic spectrum.

45. An article of manufacture in accordance with claim 41, wherein the mark is three dimensional.

46. An article of manufacture in accordance with claim 41, wherein the article is a container.

47. An article of manufacture, comprising:

a body of material having at least a portion with a mark resulting from a plasma created by localized ionization, the mark being spaced from the surfaces of the portion and the surfaces of the body, the mark having an area of increased opacity to electromagnetic radiation substantially without any detectable change to the surface, the mark having one or more numerals, letters or symbols or a combination thereof representative of a desired indicuim.

48. An article of manufacture in accordance with claim 47, wherein the body is transparent to electromagnetic radiation at wavelengths within the visible region.

49. An article of manufacture in accordance with claim 47, wherein the body is glass or plastic.

50. An article of manufacture in accordance with claim 47, wherein at least a portion of the body is opaque to electromagnetic radiation at wavelengths within the visible region such that the mark may only be detected by optical instruments operating at an appropriate wavelength within the electromagnetic spectrum.

51. An article of manufacture in accordance with claim 47, wherein the mark is three dimensional.

52. An article of manufacture in accordance with claim 47, wherein the article is a container.

\* \* \* \* \*